H. J. EDLUND.
BROOM MAKING MACHINE.
APPLICATION FILED JUNE 13, 1917.

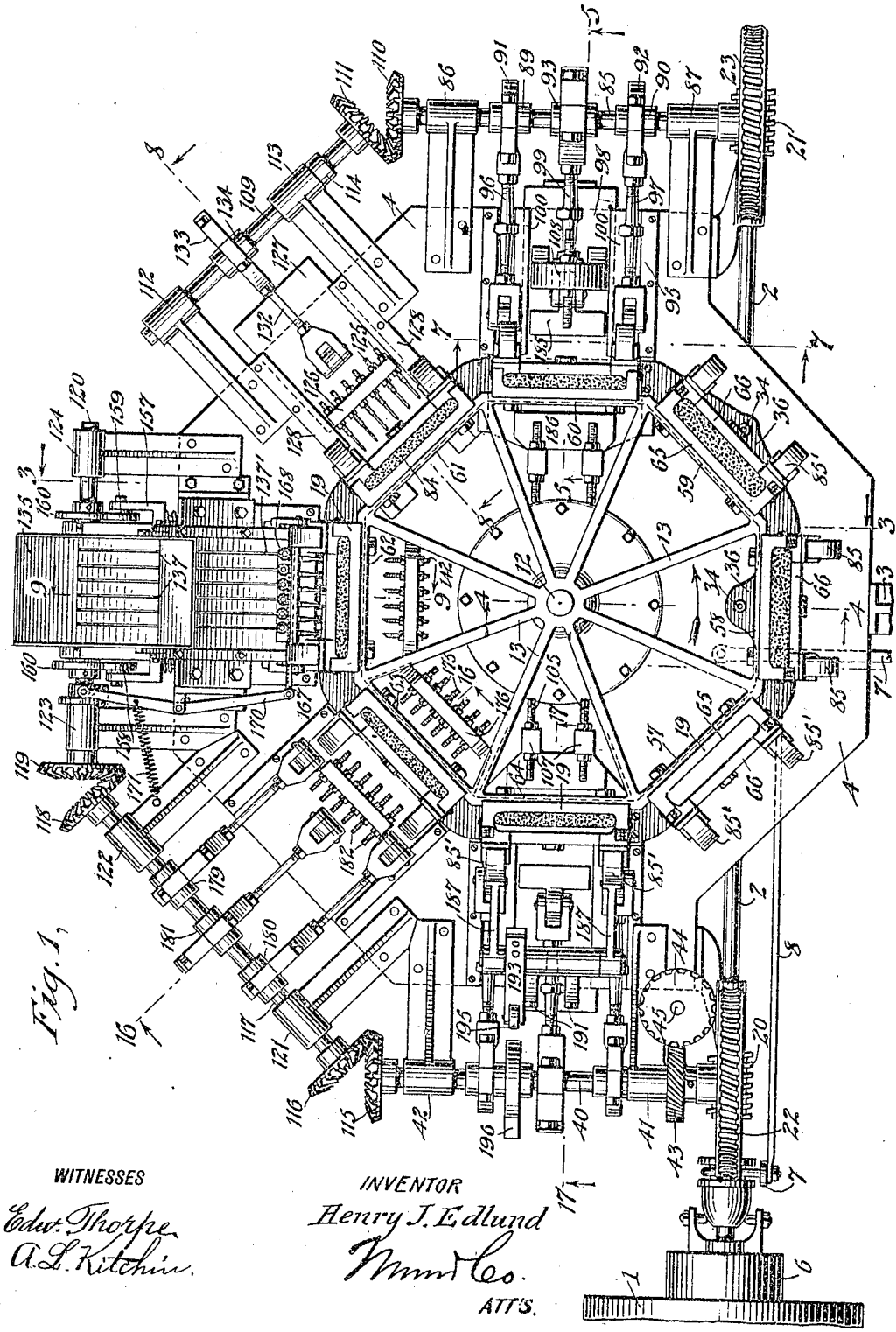

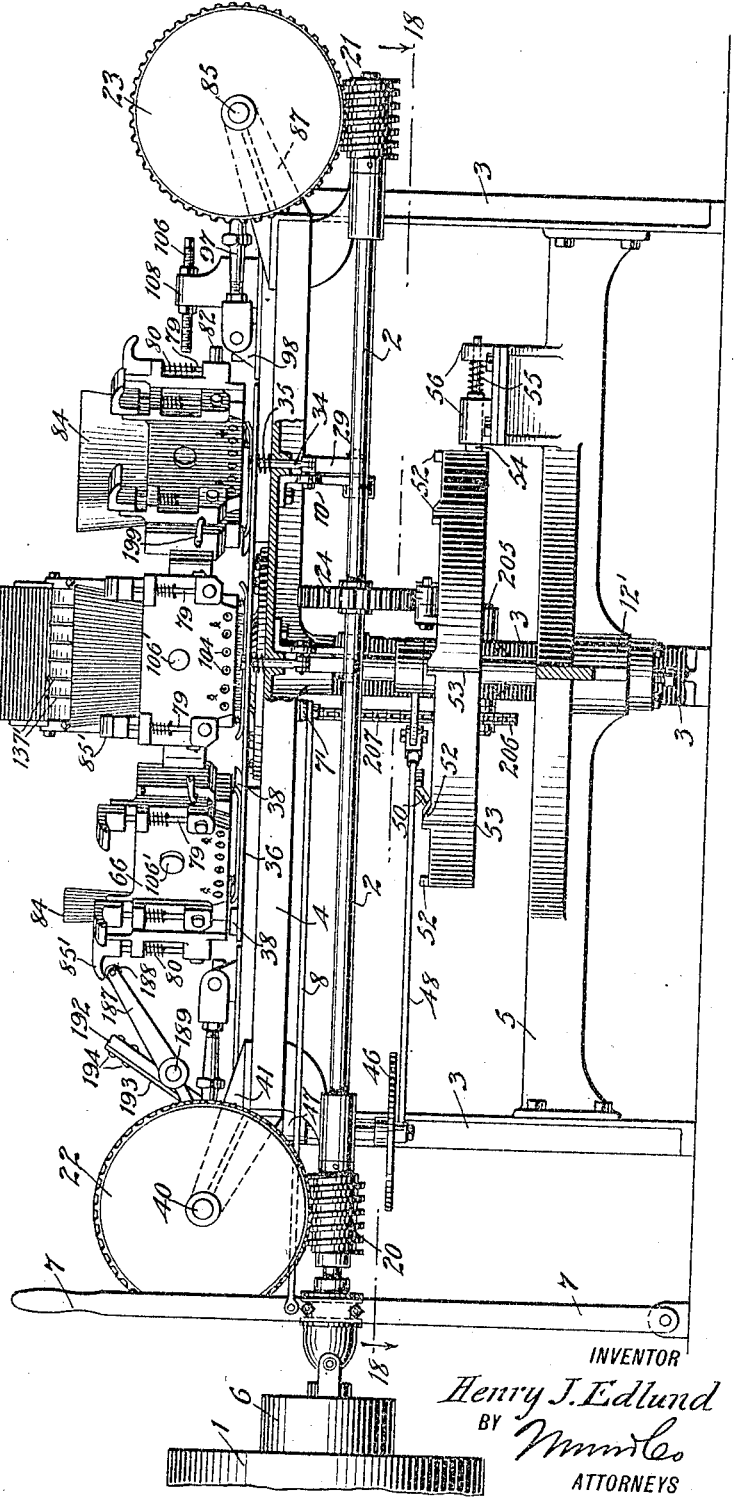

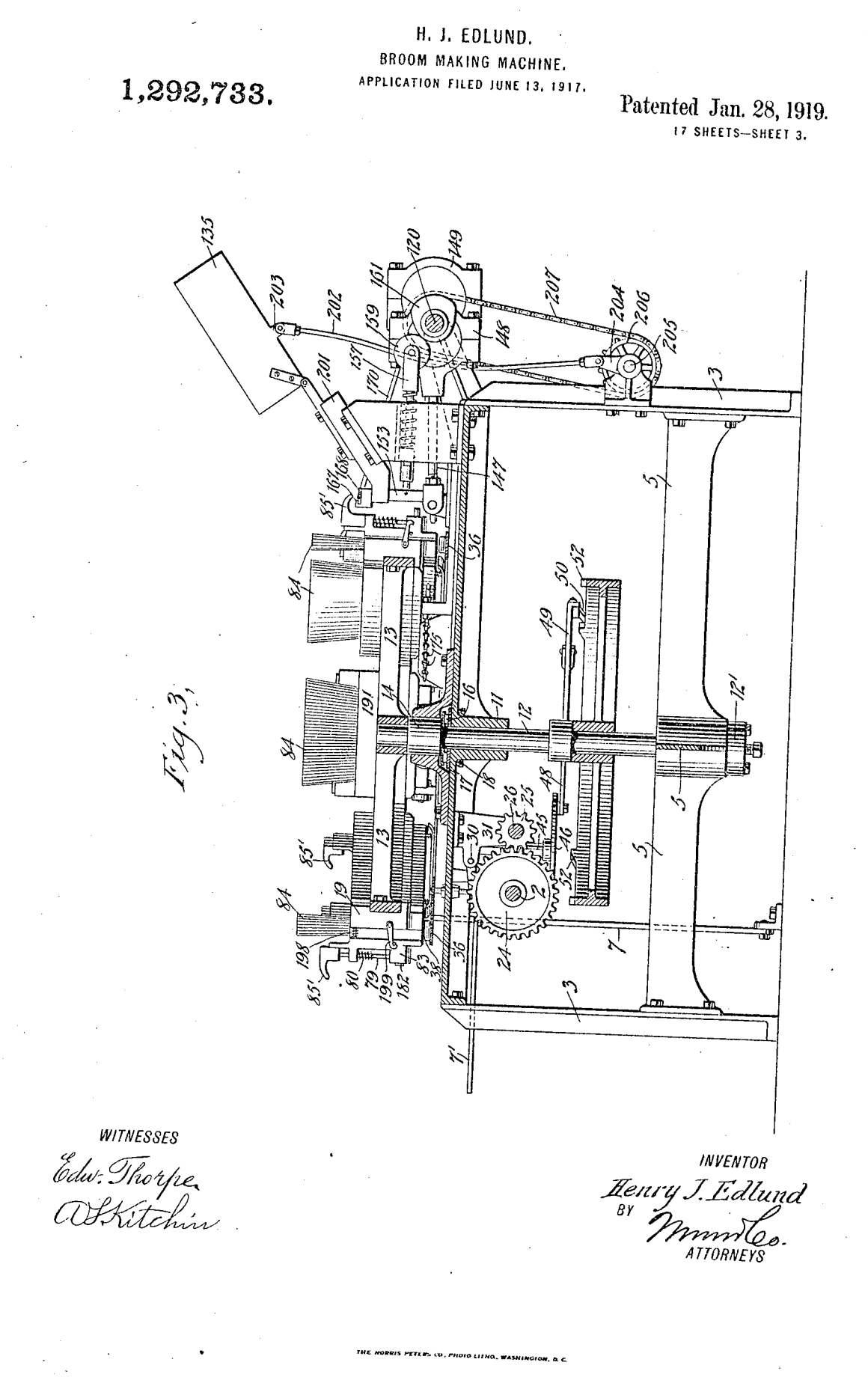

1,292,733.

Patented Jan. 28, 1919.
17 SHEETS—SHEET 3.

WITNESSES
Edw. Thorpe
A. S. Kitchin

INVENTOR
Henry J. Edlund
BY
Munn & Co.
ATTORNEYS

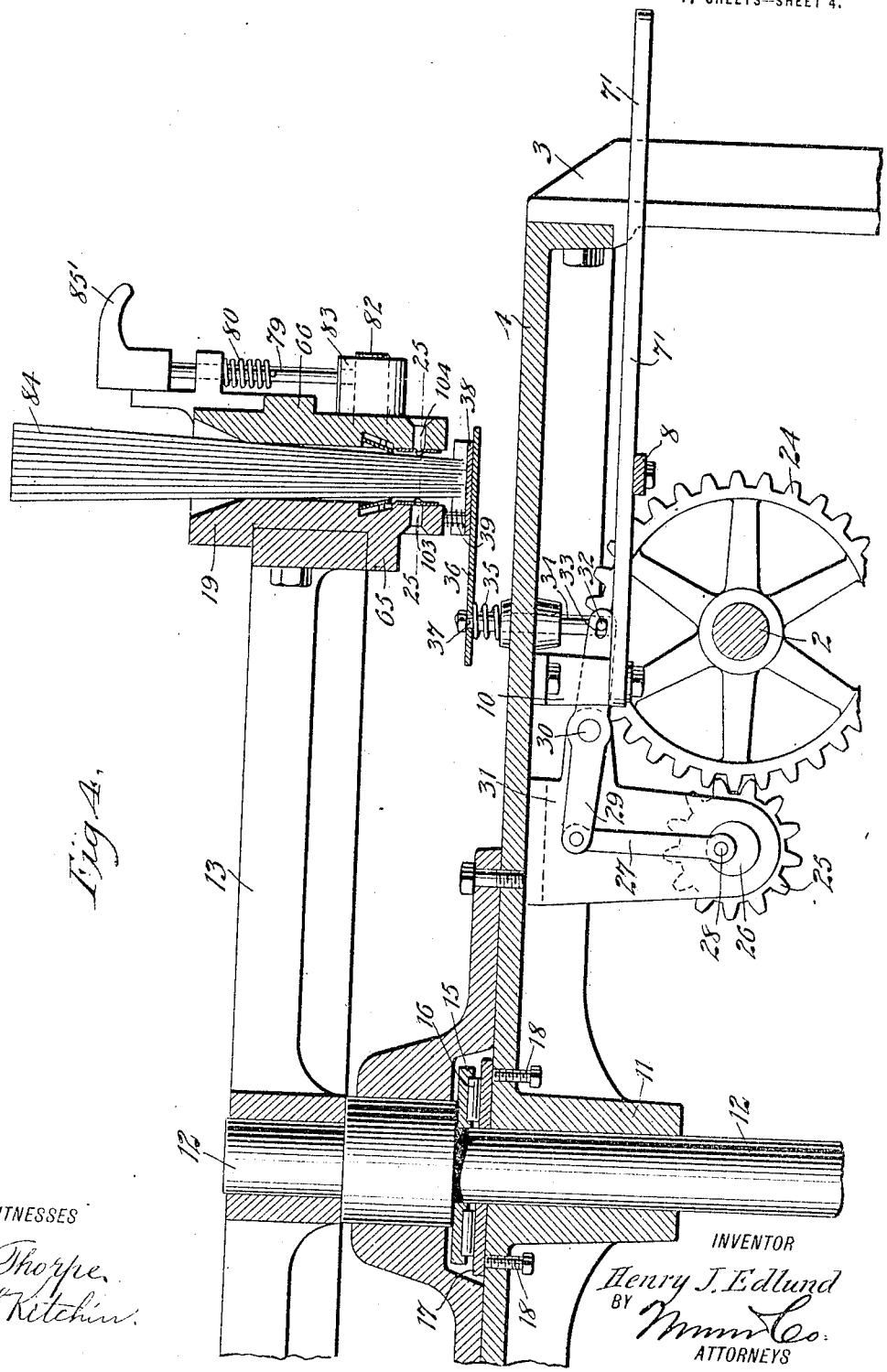

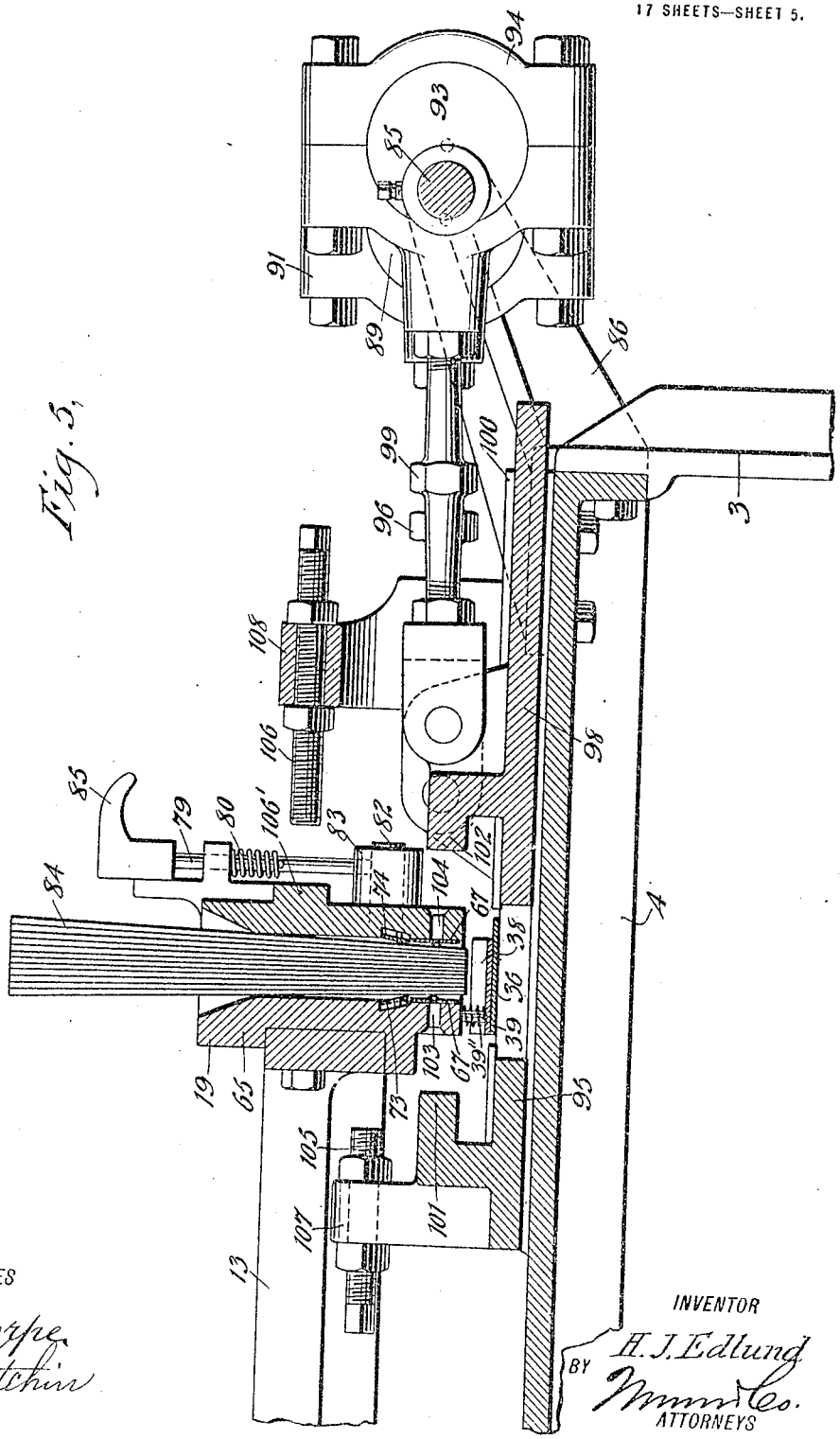

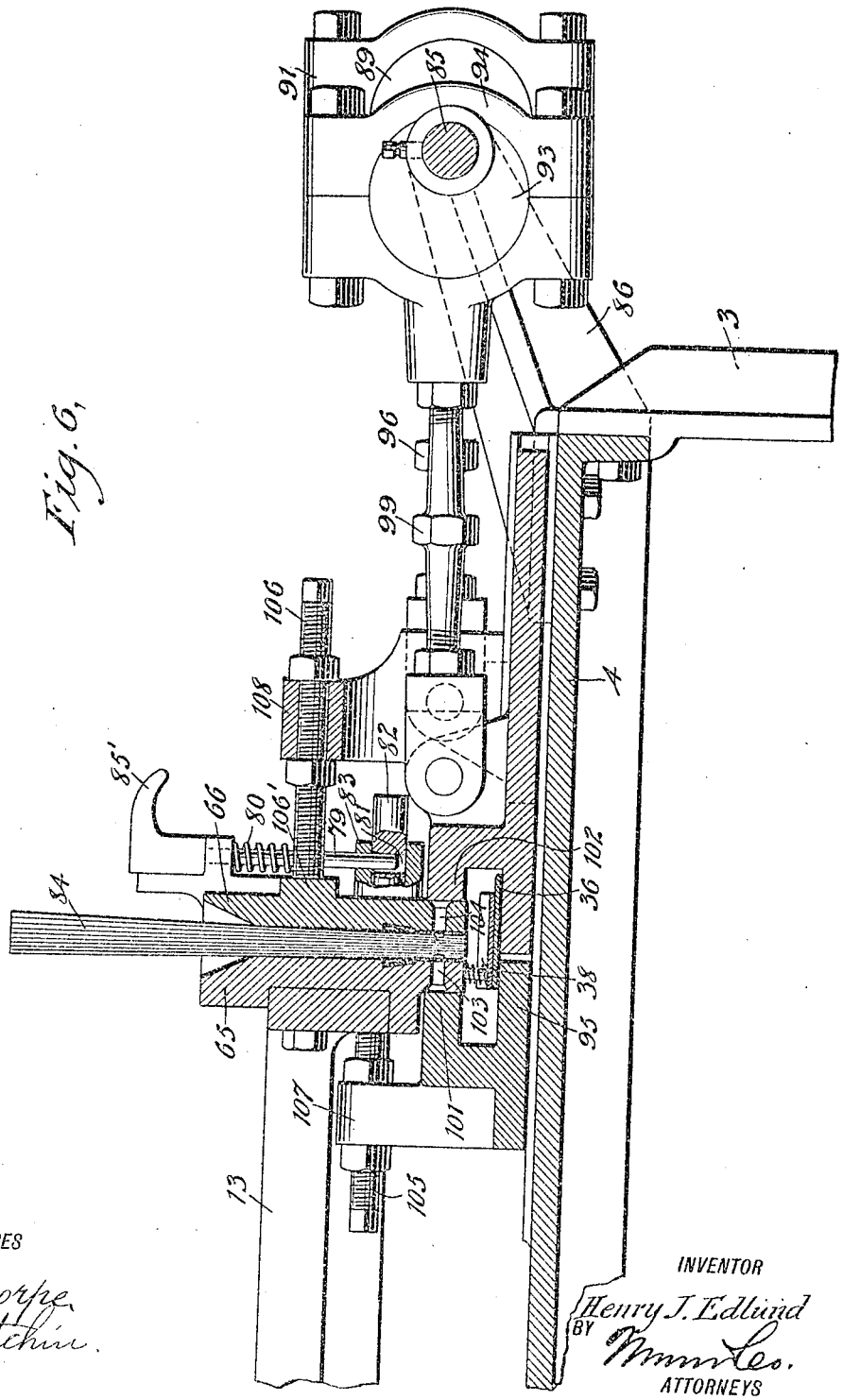

H. J. EDLUND.
BROOM MAKING MACHINE.
APPLICATION FILED JUNE 13, 1917.
1,292,733.
Patented Jan. 28, 1919.
17 SHEETS—SHEET 7.
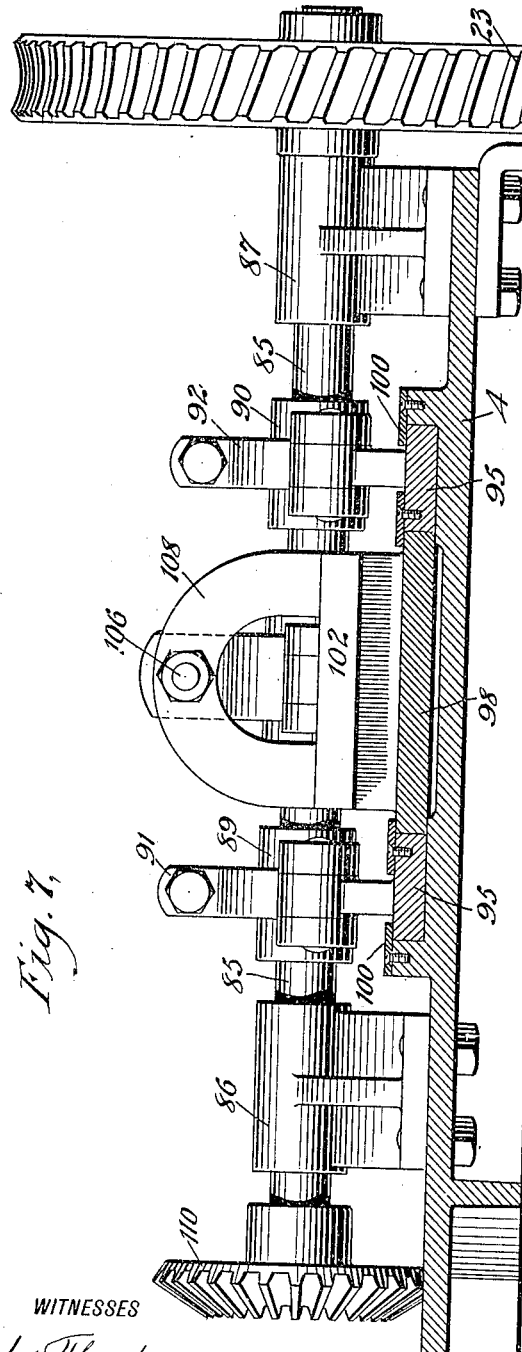
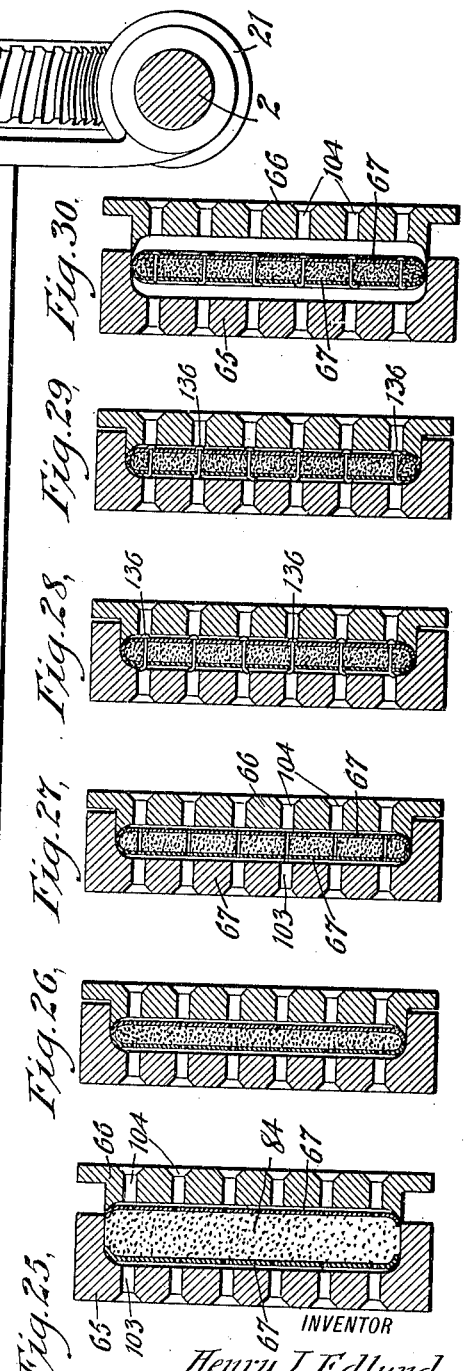
WITNESSES
Edw. Thorpe
A. L. Kitchin.
INVENTOR
Henry J. Edlund
BY
ATTORNEYS

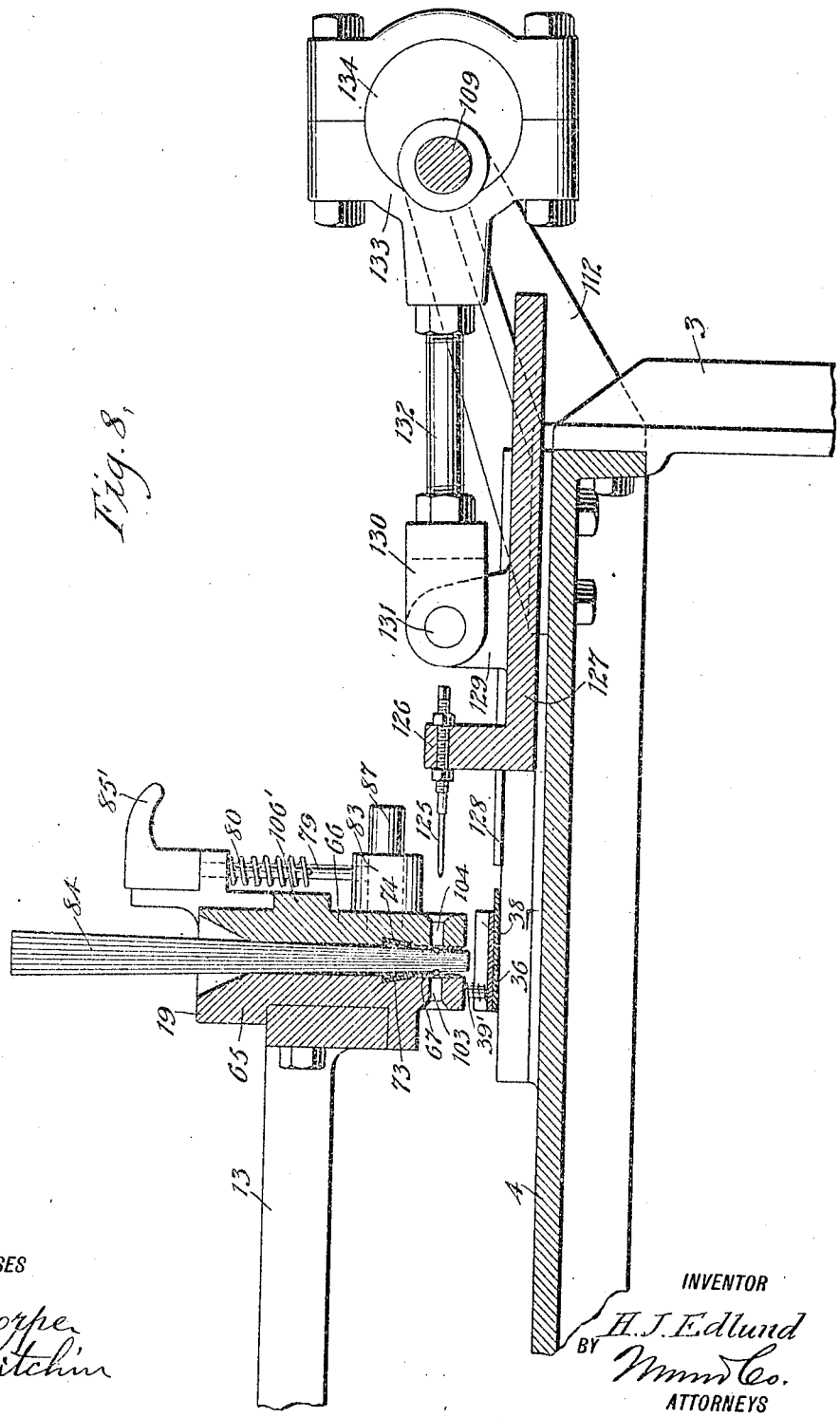

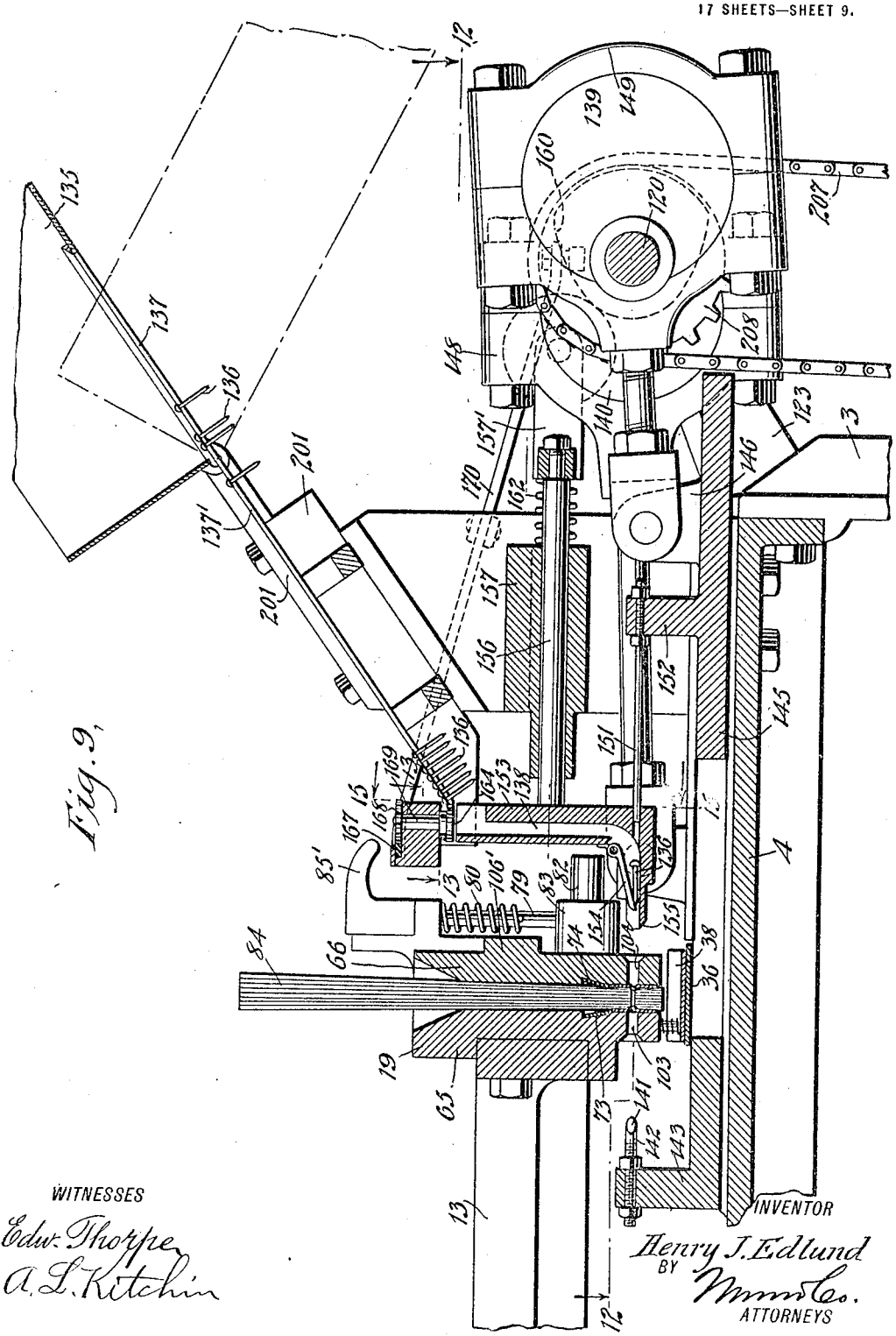

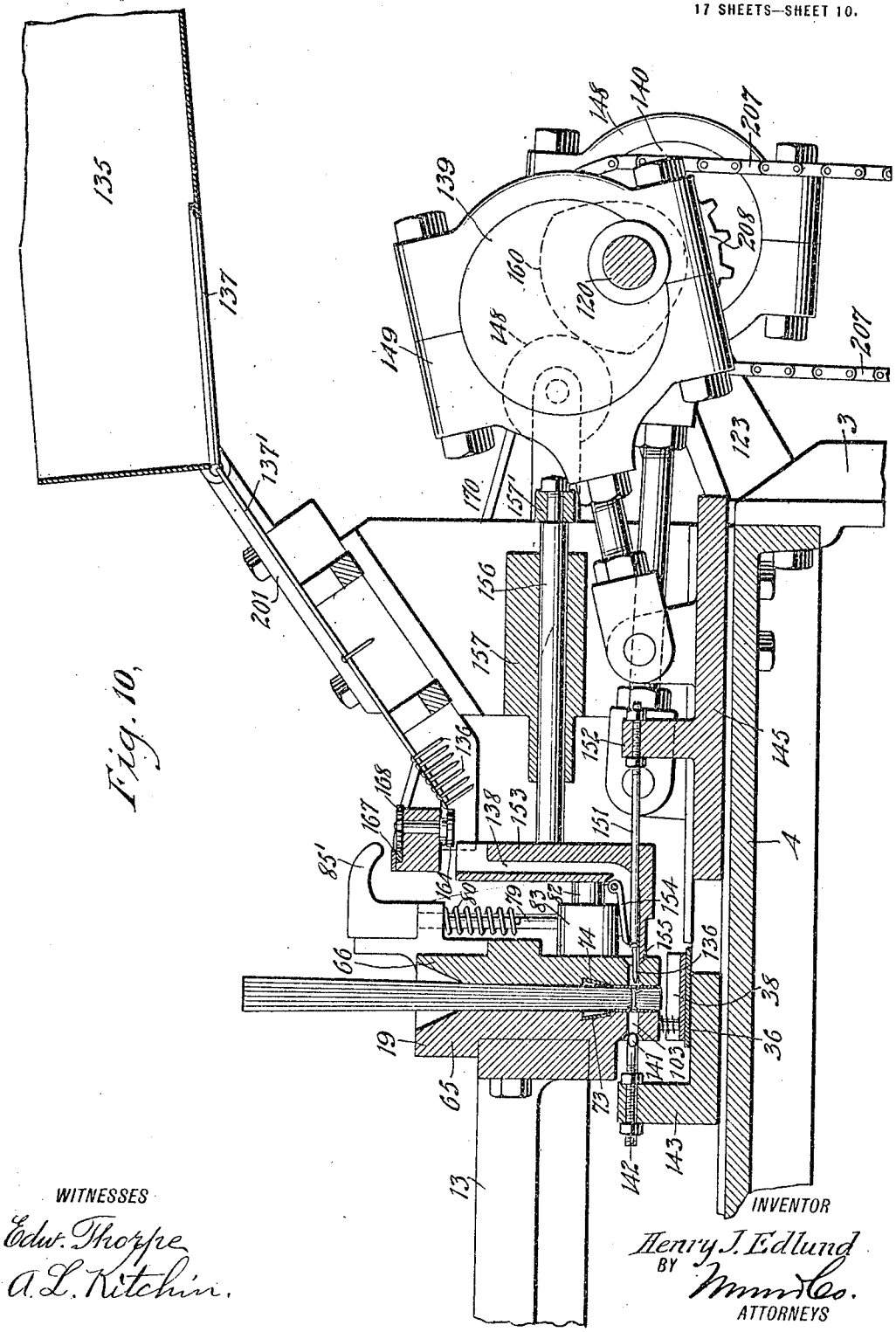

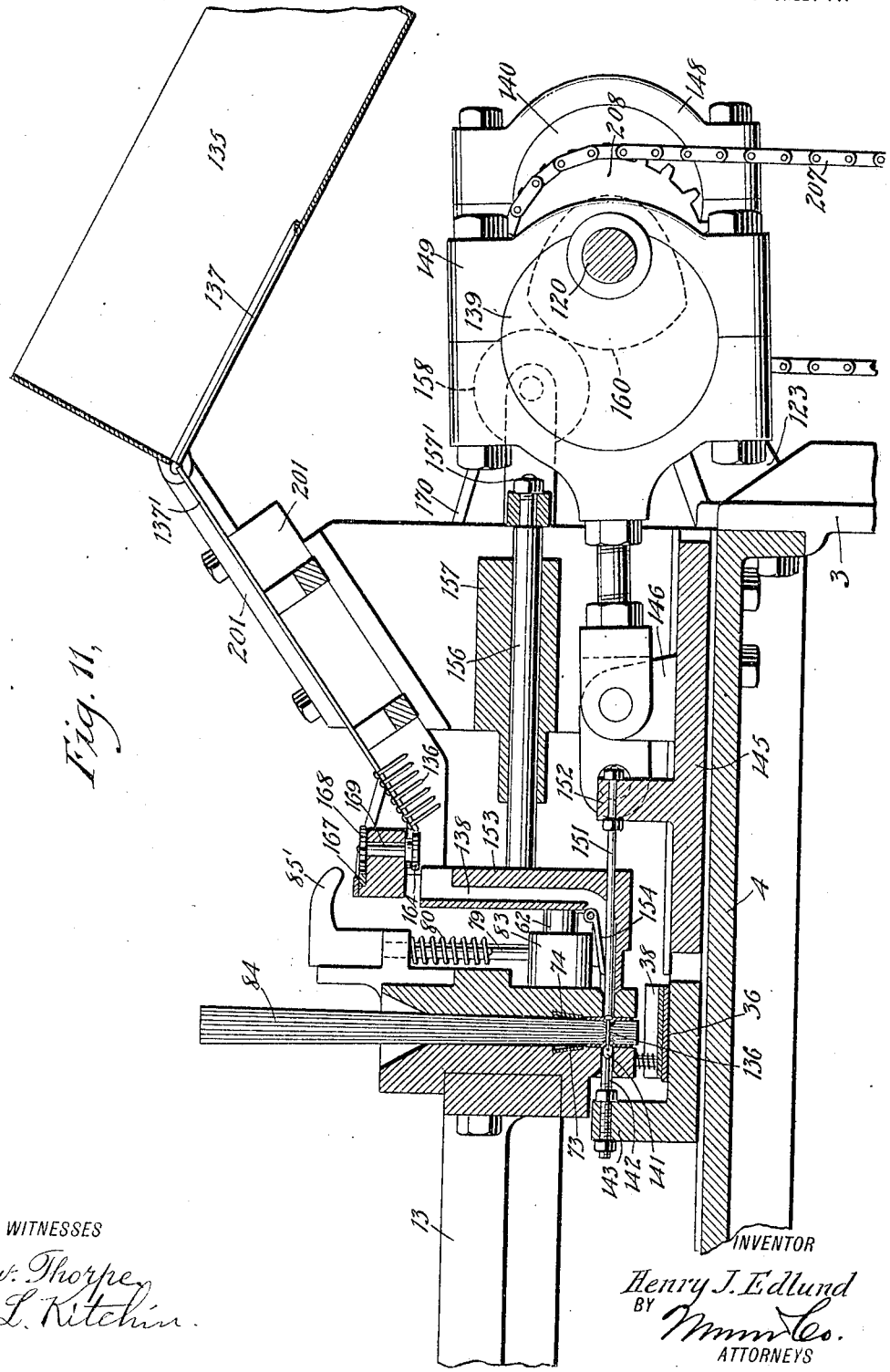

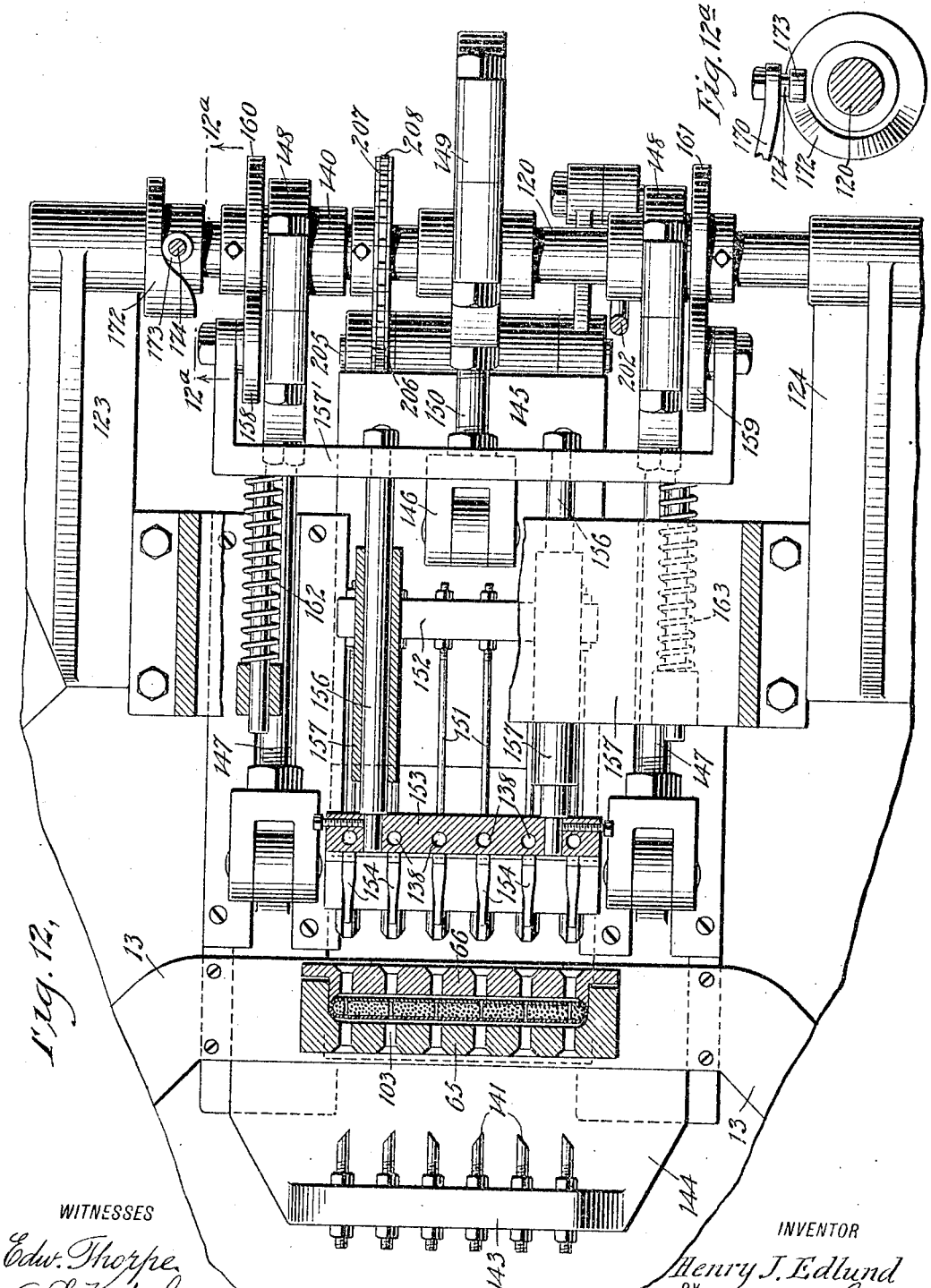

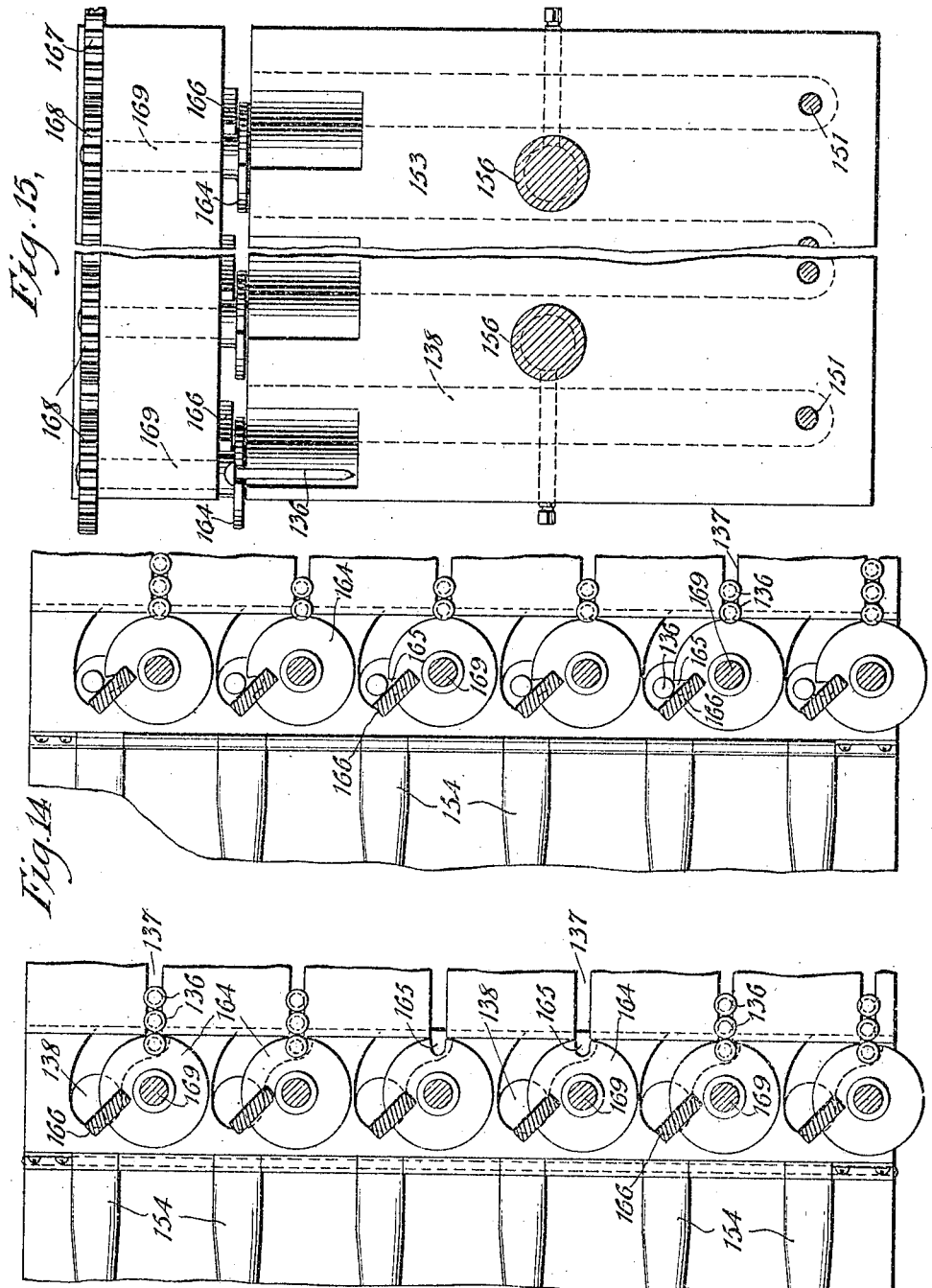

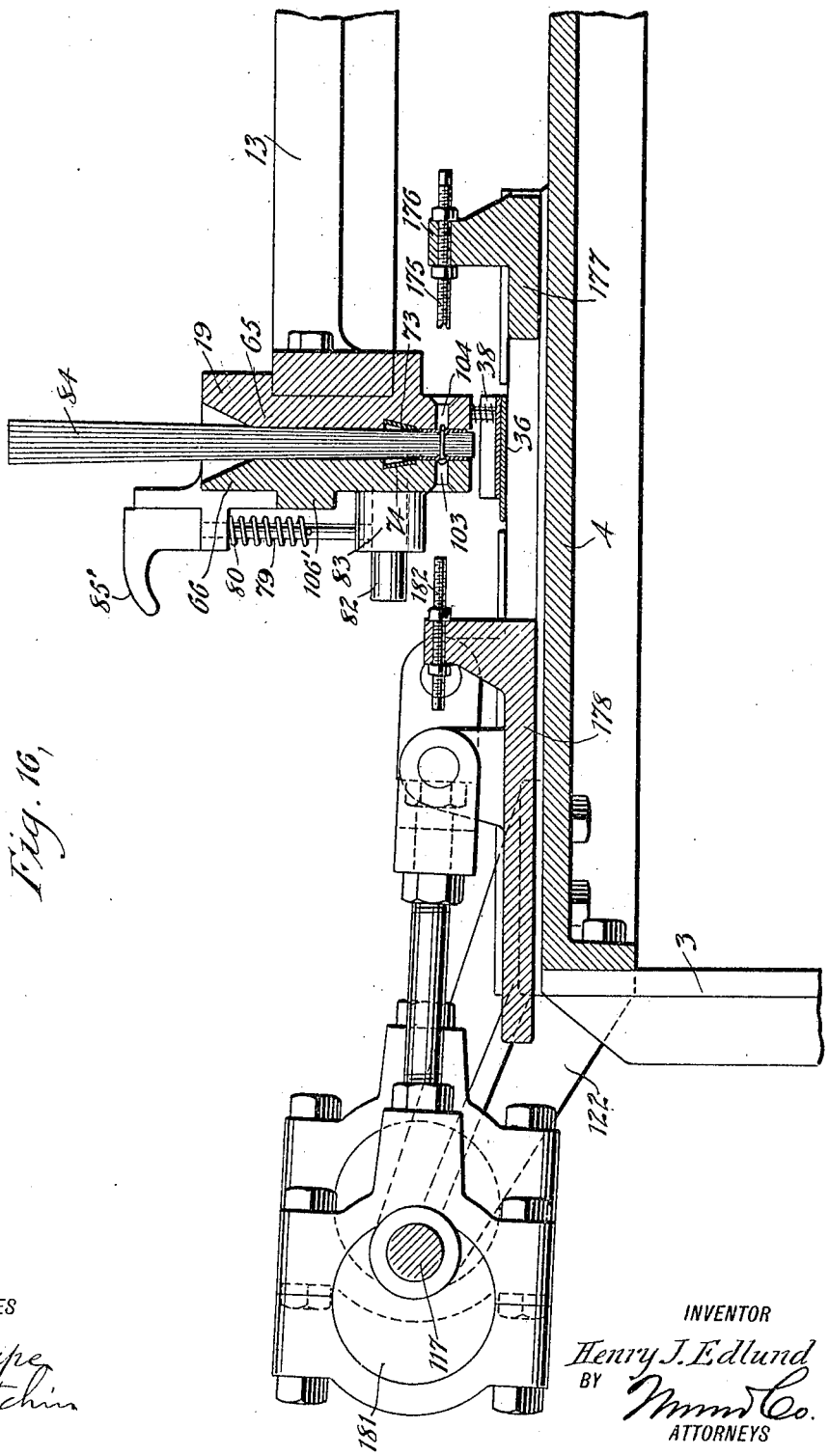

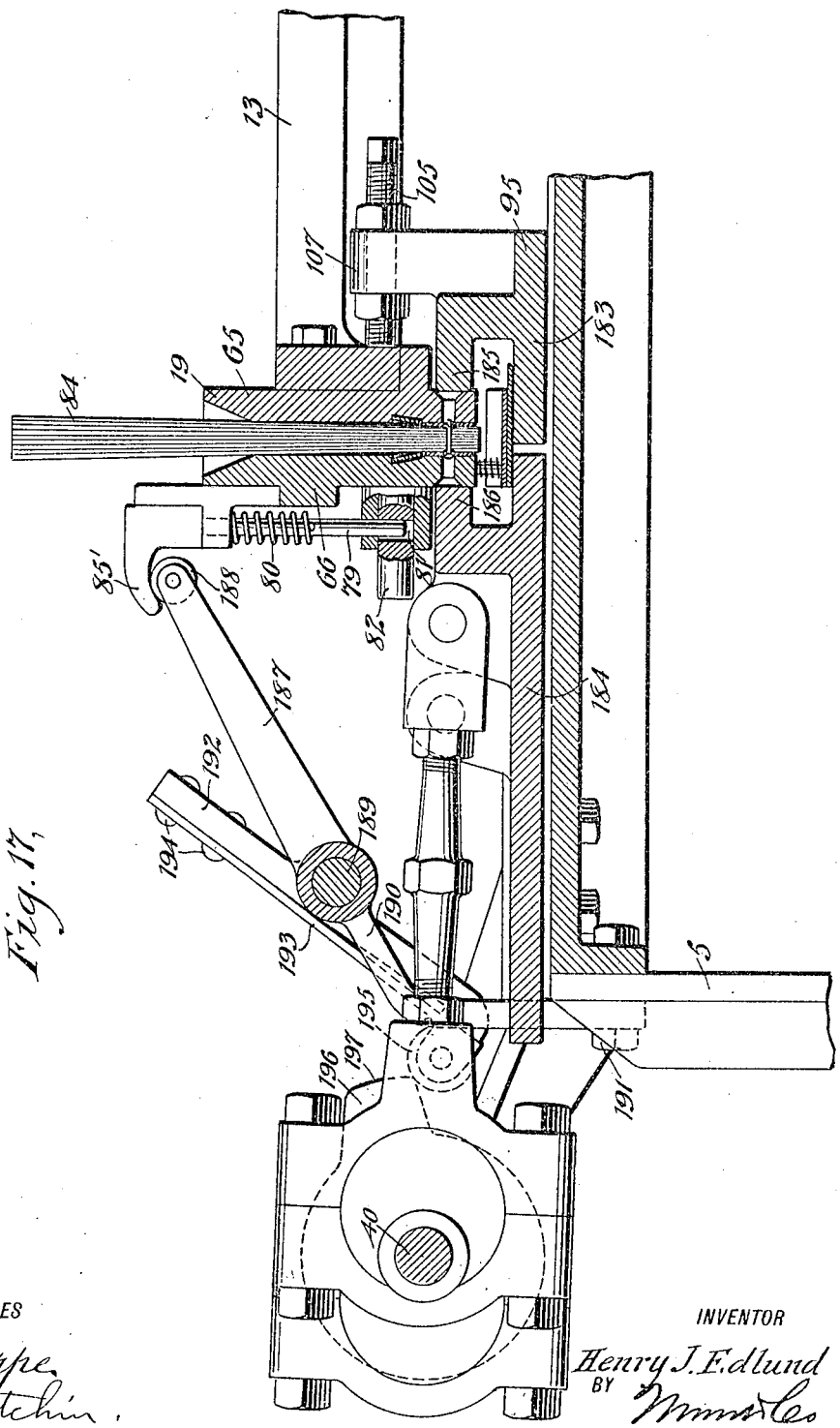

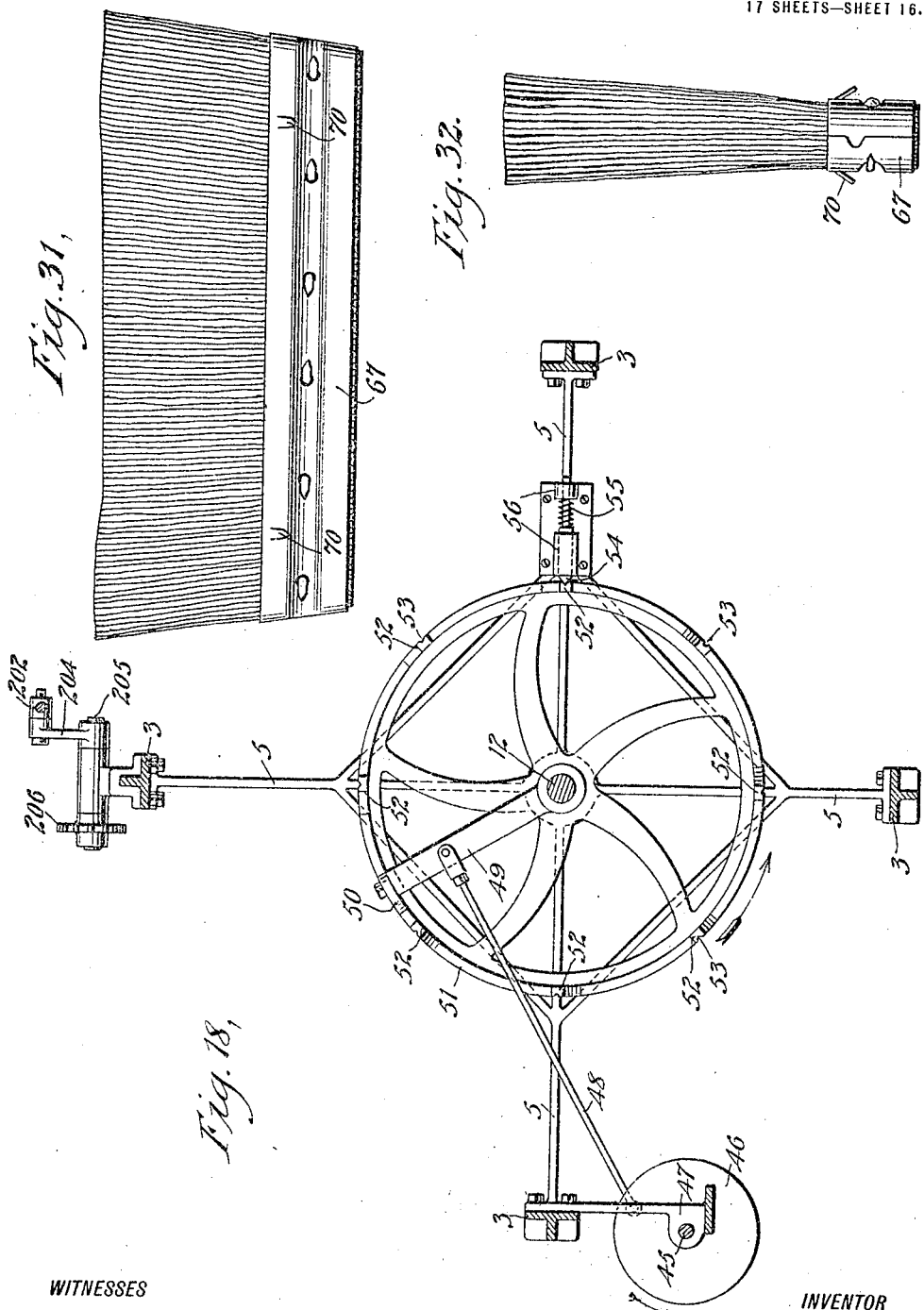

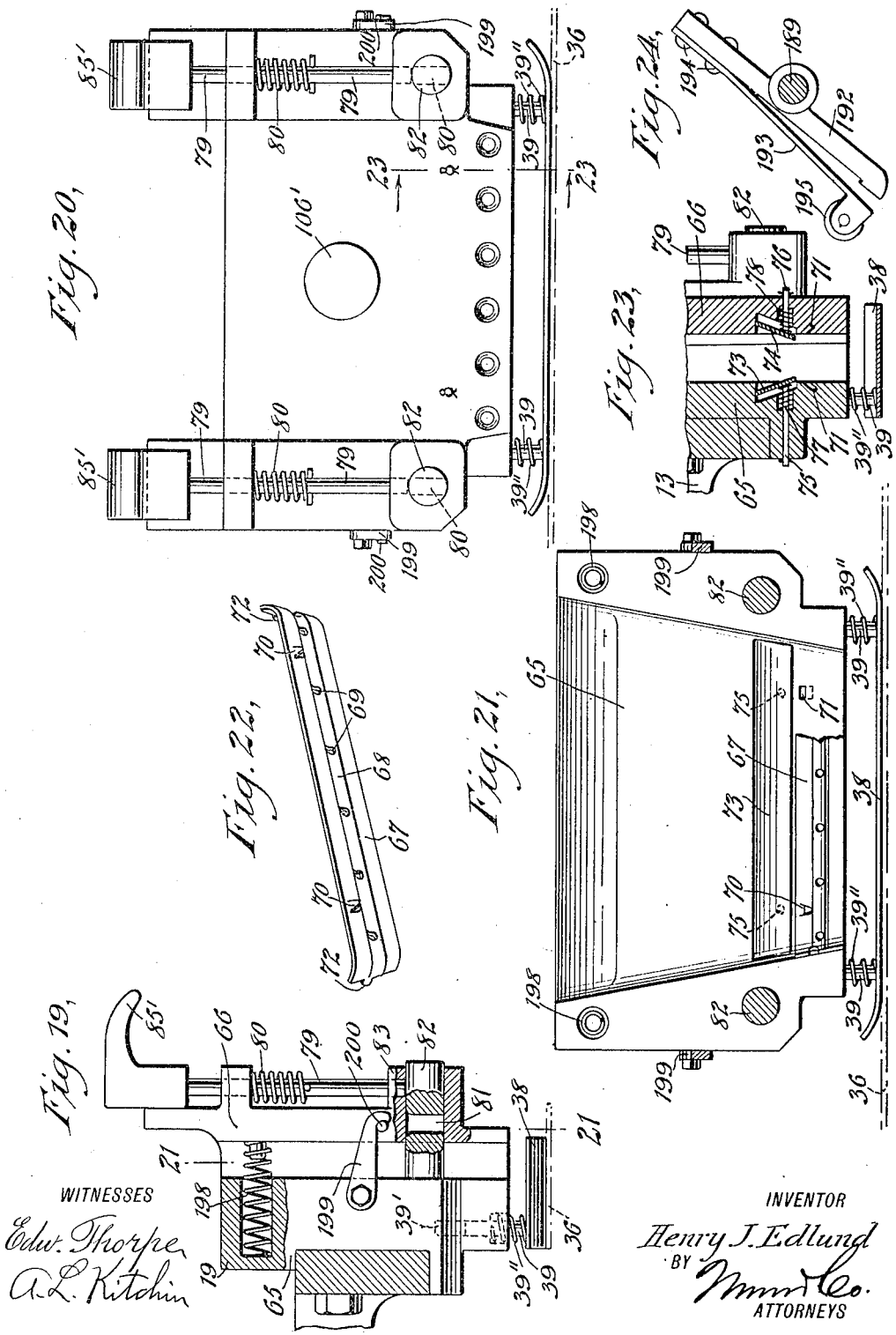

UNITED STATES PATENT OFFICE.

HENRY J. EDLUND, OF BURLINGTON, VERMONT.

BROOM-MAKING MACHINE.

1,292,733.   Specification of Letters Patent.   Patented Jan. 28, 1919.

Application filed June 13, 1917.   Serial No. 174,477.

*To all whom it may concern:*

Be it known that I, HENRY J. EDLUND, a citizen of the United States, and a resident of Burlington, in the county of Chittenden and State of Vermont, have invented a new and Improved Broom-Making Machine, of which the following is a full, clear, and exact description.

This invention relates to machines for making brooms and has for an object the provision of an improved construction for making brooms of a type shown in my Patent Number 1,200,326, issued October 3, 1916.

Another object in view is to provide an improved construction and arrangement of parts whereby there will be successive stages of operation being done simultaneously, the steps or times of movement being evenly divided, whereby an even continuous output is provided for.

Another object in view is to provide a machine for automatically clamping, shaping and riveting the brooms after the parts have been substantially properly arranged in position manually.

A further object in view, more specifically, is the provision of an improved arrangement of parts whereby the moving elements are driven from a single power member and are thereby more evenly timed so that the successive operations may be carried out in certain timed intervals and each broom operated on for the same length of time so as to produce continually the same quality of finished product.

In the accompanying drawings:

Figure 1 is a top plan view of the complete machine assembled, showing brooms in different stages of completion.

Fig. 2 is a front elevation of the structure shown in Fig. 1.

Fig. 3 is a sectional view through Fig. 1 on line 3—3.

Fig. 4 is a fragmentary sectional view through Fig. 1 on line 4—4, the same being on an enlarged scale.

Fig. 5 is a longitudinal vertical section through Fig. 1 on line 5—5, the same being on an enlarged scale.

Fig. 6 is a view similar to Fig. 5 but showing the parts in an operated or clamped position.

Fig. 7 is a transverse sectional view through Fig. 1 on line 7—7, the same being on an enlarged scale.

Fig. 8 is a fragmentary sectional view through Fig. 1 on line 8—8, the same being on an enlarged scale.

Fig. 9 is a transverse sectional view through Fig. 1 on line 9—9, the same being on an enlarged scale.

Fig. 10 is a view similar to Fig. 9 but showing the parts in an advanced position preparatory to forcing the pin or rivet into position.

Fig. 11 is a view similar to Fig. 10 but showing the pin or rivet completely forced into operative position.

Fig. 12 is a horizontal section through Fig. 9 on line 12—12.

Fig. $12^a$ is a section through Fig. 12 on line $12^a$—$12^a$.

Fig. 13 is a horizontal section through Fig. 9 on line 13—13, the same being on a slightly enlarged scale.

Fig. 14 is a view similar to Fig. 13 but showing the parts in a different position.

Fig. 15 is a transverse vertical section through Fig. 9 on line 15—15, the parts being shown on an enlarged scale.

Fig. 16 is a sectional view through part of Fig. 1 on line 16—16, the same being on an enlarged scale.

Fig. 17 is a section through part of Fig. 1 on line 17—17, the same being on an enlarged scale.

Fig. 18 is a sectional view through Fig. 2 on line 18—18.

Fig. 19 is a side view of a holder embodying certain features of the invention, certain parts being broken away for better illustrating the structure.

Fig. 20 is a front view of the holder shown in Fig. 19.

Fig. 21 is a sectional view through Fig. 19 on line 21—21.

Fig. 22 is a perspective view of one of the bands used in binding the broom corn into brooms.

Fig. 23 is a sectional view through the holders or jaws, the same being taken approximately on line 23—23 of Fig. 20.

Fig. 24 is a detail fregmentary sectional view showing in side elevation a lifting lever embodying certain features of the invention.

Fig. 25 is a transverse sectional view through Fig. 4 on line 25—25.

Fig. 26 is a view similar to Fig. 25 but showing the holder jaws closed.

Fig. 27 is a view similar to Fig. 26 but showing the parts after the broom has been punched.

Fig. 28 is a view similar to Fig. 27 but showing the rivets in position and bent to one side.

Fig. 29 is a view similar to Fig. 28 but showing the rivets clenched and the broom completed.

Fig. 30 is a view similar to Fig. 25 with the holder open and a completed broom therein immediately previous to its removal.

Fig. 31 is a side view of the finished broom.

Fig. 32 is an end view of the broom shown in Fig. 31.

Referring to the accompanying drawings by numerals, 1 indicates a power member of any suitable kind for supplying power to the drive shaft 2 supported in suitable bearings carried by the frame 3. The frame 3 is provided with a top or table 4 and with a number of braces 5, the particular detail structure of these parts being capable of change and rearrangement to a considerable extent without departing from the spirit of the invention, as these parts form merely proper supports for the other working parts of the machine. The power member 1 is connected to the shaft 2 by a clutch 6 which may be thrown in or out as desired by the operation of lever 7 so that the power is easily controlled and is used only when desired. In order to turn the power on or off at a point nearer the operating parts a rod 8 is pivotally connected with lever 7 and is also pivotally connected with lever 7', which lever extends outwardly, as shown in Figs. 1 and 4, whereby an operator may be near the working parts of the machine and at the same time control the clutch. Lever 7' is pivotally supported by a suitable bracket 10 secured to the top or table 4.

The table 4 is provided with an enlargement 11 forming a journal member for the vertical shaft 12 (Fig. 4) so that the shaft may be held in proper position while supporting the rotatable wheel structure or turn-table 13. The turn-table 13 is rigidly secured in any desired manner, as for instance by a key, to shaft 12 and bears against an enlargement 14, which enlargement in turn bears against a cone or washer 15 resting in the roller bearings 16. The roller bearings 16 operate on a bearing member 17, which bearing member may be raised or lowered through a proper movement of the set screws 18 in order to slightly raise or lower the turn-table 13 and parts carried thereby. The turn-table 13 carries a number of holders 19 hereinafter fully described. These holders and parts associated therewith are designed to receive and properly arrange the broom corn and then act on the corn so as to bind the same firmly together into a broom.

In order that the various moving parts may properly act on the broom corn or other suitable material in the various holders 19, it is necessary that the turn-table 13 rotate step by step and after each movement remain stationary for a given period. In order to accomplish this the structure shown more or less in detail in Figs. 2 and 18 is utilized. When the clutch 6 has been thrown in power will be transmitted to shaft 2 for rotating the shaft and, consequently, rotating the worms 20 and 21, which worms mesh with the respective worm wheels 22 and 23. A gear wheel 24 is also rigidly secured to shaft 2 so as to be rotated thereby, said gear wheel meshing with a pinion 25, as shown in Figs. 3 and 4, whereby said pinion is rotated and, consequently, rotates its shaft 26. A link 27 is eccentrically journaled at 28 on shaft 26 and as pinion 25 rotates said link 27 will move upwardly and downwardly. The upper end of link 27 is pivotally connected with a lever 29 journaled at 30 on the bracket 31, which bracket also supports the pinion 25. The up and down movement of lever 29 operates through pin 32 extending into the slot 33 for causing the rod 34, which is rigidly secured to pin 32, to move upwardly and downwardly, the downward movement being against spring 35 surrounding the upper part of rod 34. The upper part of rod 34 is reduced so as to present a shoulder in order that the table 36 may be rigidly clamped to the rod 34 by a nut 37. The table 36 extends preferably beneath three of the holders 19, as shown in Fig. 2, so that when the broom corn is first placed in the holder it will rest on this platform or table and may be acted on by this table until the jaws of the holders have been closed, as hereinafter fully described. It will be understood that the broom corn does not rest directly upon the table 36 but upon a supporting plate 38 carried by rods 39 which are acted on directly by the table 36.

From the above it will be seen how power is transmitted to the worm gears 22 and 23 and also to mechanism for raising and lowering the table 36 in order to properly adjust the broom corn. In order to rotate the turn-table 13 in addition to accomplishing the purposes just mentioned, power is transmitted from the worm gear 22 to shaft 40 supported by suitable brackets 41 and 42. A spiral gear 43 is rigidly secured to the shaft 40, as shown in Fig. 1, said spiral gear meshing with a second spiral gear 44, which last mentioned spiral gear is rigidly secured to a vertical shaft 45 carrying a disk 46 at its lower end, as shown in Figs. 2 and 18. The disk 46 is held in proper position by a bracket 47 and as it rotates it moves a link 48 and said link is pivotally connected to said disk at a point distant from the center so that as the disk rotates the link will be moved in a back and forth movement longitudinally. The opposite end of the link 48 to that connected with disk 46 is pivotally connected with an arm 49 loosely journaled on the shaft 12 and carrying a pawl 50 at its outer end. Pawl 50 is preferably maintained in proper position by the action of gravity, though a spring may be used if desired for causing the pawl to normally remain in contact with the horizontal wheel 51, which horizontal wheel is rigidly secured in any desired manner to the shaft 12.

The horizontal wheel 51 is provided with a plurality of stops 52 having a beveled side and a vertical side so that when the arm 49 moves in one direction the pawl 50 may freely slide over the stop but when said pawl is moved in the opposite direction the wheel 51 and parts connected thereto will be moved therewith. There is provided one stop 52 for each of the holders 19 and they are spaced an equal distance apart in a similar manner to the holders so that upon one half of a revolution of the disk 46 the wheel 51 and parts connected thereto will be stationary and on the other half of the revolution of disk 46 the wheel 51 and parts connected thereto, including the holders 19, will move. By this construction and arrangement if the drive shaft 2 is allowed to rotate at a constant speed there will be the same time occupied during the movement of the turn-table 13 as during the stationary period thereof. In order to lock the wheel 51, turn-table 13 and associated parts, the wheel 51 is provided with a notch 53 at each stop 52, into which the locking pin 54 snaps by reason of the action of spring 55, as shown in Fig. 18. The pin 54 is guided by suitable bearings 56, one of said bearings acting as a stop for spring 55 so that the spring 55 will continually urge the pin 54 to the position shown in Fig. 18. The opposite sides of the point of the pin 54 are beveled so that when the wheel 51 begins to move the pin may back out of the notch and readily slip into the next notch.

The turn-table 13 is supported by shaft 12 so as to rotate as heretofore described, said shaft being supported in a suitable journal box 12' connected with or forming part of the brace 5. As shown in the drawing, the turn-table 13 is divided into eight sections or segments, though it may be divided into a greater or less number without departing from the spirit of the invention. This turn-table has connected therewith eight holders 19, as shown in Fig. 1, these holders being of identical construction and designed to be operated on in different ways during the successive steps of operation of the machine so as to evenly arrange the broom corn, compress the broom corn and apply retaining clips and rivets thereto. The first stage of operation is where the broom corn is placed into the holder 19 of section 57. This section rotates step by step until it finally moves back to the position shown in Fig. 1. The remaining sections 58, 59, 60, 61, 62, 63 and 64 are identically constructed with the section 57 and the holders 19 therein are also identically constructed with the holder 19 in section 57, but as shown in Fig. 2 the various mechanisms associated with the holders are in different stages of operation.

Each of the holders 19 is provided with jaws 65 and 66, jaw 65 being bolted or otherwise rigidly secured to the turn-table 13 while jaw 66 is movable radially toward and from jaw 65. When the broom corn is first placed into the holder 19 in section 57 it will be arranged substantially as shown in Fig. 4, with the lower ends of the straws in different planes. In order to even up these straws the table 36 is moved upwardly and downwardly as heretofore described so as to cause all the straw to move into proper alinement. This up and down movement of the table 36 acts on the broom corn from the time it is placed in the holder in section 57 until said holder has passed the position of section 59. The shaking table or plate 36 not only evens the ends at the bottom but acts to shake down all straw that is short, making all ends of straw, short or long, even at the bottom. When passing from the position of section 59 to the position of section 60 the broom corn will have assumed the position shown in Fig. 5, with the lower edge perfectly straight and also the upper edge straight if the broom corn has been properly cut. The table 36 acts on the supporting plate 38, which supporting plate is held in position preferably by several rods 39 slidingly mounted in sockets 39', formed in jaw 65, said rods being surrounded by a spring 39'' for resiliently forcing said plate downwardly, as shown in Fig. 19.

Before the broom corn is placed in the holder 19 a band member 67, shown in detail in Fig. 22, is placed loosely in the holder, each part thereof comprising a strip of metal formed with an inwardly depressed section 68 having apertures 69 arranged therein. Along one edge of each part of the band are spurs 70 adapted to fit into notches 71 in the jaws 65 and 66 (Fig. 23). Each of the bands 67 is also preferably provided with a lug 72 fitting in the notch in the opposite band so as to provide an overlapping section at the ends. The bands 67 are loosely arranged in position manually and then the broom corn is forced manually into position, substantially as shown in Fig. 4. The broom corn is reasonably loose when placed in this position but is guarded against catching in the depressions in the bands 67 by the plates 73 and 74 (Figs. 21 and 22), said plates being guided by suitable guiding rods 75 and 76 and resiliently urged a predetermined distance inwardly by springs 77 and 78. It will be noted that the plates 73 and 74 are arranged in notches in the jaws 65 and 66 so that when these jaws are forced together as hereinafter fully described the plates 73 and 74 may recede into their respective notches.

After the proper amount of straw has been arranged manually in the empty holder 19, which as shown in Fig. 2 is in section 57, the machine is started by closing the clutch 6 unless the machine is already in operation. This will cause, after a certain interval of time, the section 57 to occupy the position of section 58. After another interval of time the section will move to the position of section 59. When in these three positions the table 36 is continually acting for straightening out the broom corn and forming a perfectly straight bottom edge, as shown in Fig. 5. After the holder has remained in the position shown by section 59 in Fig. 1 for a predetermined length of time it is moved to the position shown by section 60 and remains in that section for a certain length of time, according to the speed of the machine. While remaining in the position of section 60 the pressing mechanism shown in Fig. 5 will be moved from the position shown in Fig. 5 to that shown in Fig. 6 and will close the jaws 65 and 66.

When the jaws have been forced to a closed position the pin 79 will drop or move under the action of a spring 80 into the opening 81 in the extension 82 of jaw 65. The pin 79 is normally arranged so that one end will be in the extension 83 of jaw 66 so that when the parts move to the position shown in Fig. 6 the jaws will be locked together and the broom corn 84 will be held in a clamped or compressed position. Only one pin 79 and associated parts have been described but it is to be observed that there is one pin on each edge of jaw 65, as shown in Fig. 1, but the description of one will equally apply to both. The upper end of pin 79 carries a hook 85' which is designed to be engaged by a lifting member hereinafter fully described when all of the operations on the broom corn 84 have been completed.

The mechanism for pressing or closing the jaws is shown more or less in detail in Figs. 1, 5 and 6 and receives power from the shaft 2 through the worm gear 23 and shaft 85, which shaft is supported in suitable brackets 86 and 87. Rigidly secured to the shaft 85 are eccentrics 89 and 90 carrying the usual eccentric straps 91 and 92, while a central eccentric 93 is also secured to shaft 85 carrying a strap 94. The straps 91 and 92 are connected to a slide 95 through adjusting members 96 and 97, said adjusting members being preferably provided with right and left hand threads at the opposite ends so as to vary the distance between the straps 91 and 92 and the slide 95. The strap 94 is connected to a slide 98 by a connecting member 99 preferably having right and left hand threads at the opposite ends so as to vary the distance between the strap 94 and the slide 98. It will be observed that the slide 95 is subtantially U-shaped and is provided with overhanging sections 100 so as to act as a guide for the slide 98. The head or cross bar of the U-shaped slide 95 is provided with an anvil or presser head 101 while the slide 98 is provided with an anvil or presser head 102, said anvils or presser heads being in the same horizontal plane as the apertures 103 and 104 formed in the jaws 65 and 66. The eccentrics are set as shown in Figs. 5 and 6 so that when they make one half of a revolution the parts will be moved from the position shown in Fig. 5 to that shown in Fig. 6 and the next half revolution will bring them back to the position shown in Fig. 5. The pressing action or contact of the presser heads 101 and 102 with the jaws occurs when the jaws and the turn-table are stationary.

In order that a perfectly straight closing of the jaws may be had, adjustable screws 105 and 106 are provided, as shown in Fig. 6, the presser screw 105 being arranged in suitable brackets 107 extending upwardly from the slide 95, while the presser screw 106 is fitted into an arc-shaped bracket 108 rigidly secured to or formed integral with the slide 98, said bracket overhanging part of the member 99 and the pivotal connection thereof with the slide 98. When the parts are moved to a closed position the screw 105 will press against part of the turn-table 13 and the screw 106 will press against the enlargement 106' of jaw 66, whereby the jaw 66 will move properly into a closed position, though by a slight adjustment of the screw 106 the upper part of the jaw may flare outwardly slightly so as not to compress the broom corn 84 as tightly at the upper part of the jaw as at the lower part. The rotary movement of the eccentric on shaft 85 is continuous and as soon as the heads 101 and 102 have released the jaws 65 and 66 the holder 19 on turn-table 13 begins to move and moves to the next position so as to occupy the position indicated by the section 61 in Fig. 1, and the cams on shaft 85 and parts associated therewith will begin to operate on the next holder 19 while the holder 19 in section 61 is operated on as hereinafter fully described.

As heretofore described, power is transmitted from shaft 2 by worm 21 and worm gear 23 to shaft 85. From shaft 85 power is transmitted to shaft 109 through the beveled gears 110 and 111. The shaft 109 is journaled in brackets 112 and 113, said shaft having a collar 114 for limiting the movement of the shaft longitudinally. In addition to power being transmitted to the shafts 85 and 109, power is also transmitted from shaft 2 through worm 20 and worm gear 22 to shaft 40 and from thence through beveled gears 115 and 116 to shaft 117. From shaft 117 power is transmitted through beveled gears 118 and 119 to shaft 120. Shaft 117 is supported by brackets 121 and 122 while shaft 120 is supported by brackets 123 and 124. These brackets, as well as the other supporting brackets, are bolted or otherwise rigidly secured to the top 4, though they may be connected with any other part of the supporting framework if desired. By use of two worm gears power is transmitted from both sides of the machine around the periphery and binding and loss by friction are reduced to a minimum or entirely eliminated while ample power is provided for the various moving parts.

The mechanism operated by shaft 109 which is opposite section 61 is intended to punch holes in the compressed broom corn preparatory to having rivets placed therein. In order to prepare an aperture through the broom corn for each aperture in the bands 67 a number of punches 125 are secured to an upstanding member 126 on the slide 127 held in place by suitable guides 128. An upstanding lug 129 (Fig. 8) is provided on the slide 127, said upstanding lug being straddled by a fitting 130 which is connected with the lug by a pivotal pin 131. An adjustable bar 132 is connected to the fitting 130 and also to the strap or casing 133 of the eccentric 134 rigidly secured to shaft 109. This eccentric is so positioned as to cause the punches 125 to pass through the broom corn 84 and then move back away from the broom corn while the holder 19 is in the position indicated by section 61.

After the punches have punched holes in the broom corn the holder moves again to the position indicated by section 62 in Fig. 1, wherein rivets are placed in the apertures made by the punches, said rivets being also turned over or bent to one side, as shown in Fig. 28. Later these rivets are clenched as shown in Fig. 29. When the holder 19 has reached the position indicated by section 62 in Fig. 1 the various parts are substantially in the position shown in Figs. 1 and 9. As shown in Fig. 9, a box or container 135 is provided in which a plurality of pins or rivets 136 are positioned, said pins being capable of passing through the slot 137 except their heads when the container 135 is agitated. As soon as the rivets or pins enter the slots 137 they gravitate to the lower part of said slots and when permitted enter the various vertical passageways 138. It will be understood that there is one slot 137 and one passageway 138 for each aperture provided by the punches 125. As soon as the rivet enters the passageway 138 it moves downwardly to the position shown in Fig. 9, and then as soon as the eccentric 139 and also the eccentric 140 rotate for half a revolution the rivets will be moved as shown in Figs. 10 and 11, namely, so as to pass through the corn 84 and the bands 67 and engage the beveled face 141 of their respective anvils 142 which are adjustably mounted on a projection 143 of slide 144. This will cause the rivets to be bent over as shown in Fig. 28. The slide 144 is made similar to the slide 95 so that the same will need no additional description, while the slide 145 is similar to slide 98 except that it is provided with a single upstanding lug 146 instead of an arched member. The slide 144 is connected through adjustable connecting rods 147 to the casings or cam straps 148 of the cams or eccentrics 140, while the eccentric 139 is connected to the slide 145 through the casings or cam straps 149, connecting rod 150 and the upstanding lug 146. By this construction and arrangement when the shaft 120 rotates all the cams just mentioned will be moved in proper timed relationship to produce the results described and shown in Figs. 11 and 28. From Figs. 12 and 28 it will be seen that the two center rivets are bent toward each other and the remaining rivets are bent outwardly. This is caused by the particular position and arrangement of the anvils 142.

As shown in Figs. 10, 11 and 12 a plurality of rammers or sets 151 are provided which are adjustably clamped to the upstanding lug 152 of slide 145. Said sets or rammers slidingly fit apertures in the apertured plate 153 so that the rivets may be pushed positively into position. A pivotally mounted weight 154 is provided for properly holding the rivets in position until positively pushed into the broom corn. As shown in Fig. 9, the plate 153 is an appreciable distance from the holder 19 so that the guiding extension 155 could not very well guide the rivet into position so that the plate 153 is arranged to be carried bodily over from the position shown in Fig. 9 to that shown in Fig. 10 substantially simultaneously with the movement of the rammers 151. The plate is then held in that new position until the rammers have done their work and begin to withdraw, whereupon the plate will also withdraw. This action is produced by supporting the plate 153 on the rods 156 guided by suitable guiding members 157. The rear of the rods 156 are rigidly secured by any means, as for instance, nuts, to the U-shaped frame 157', which frame carries rollers 158 and 159, said rollers continually engaging the cams 160 and 161, said cams being rigidly secured to shaft 120. In Fig. 10 will be seen the shape of these cams in dotted lines, said shape being such as to force the plate 153 more or less quickly over to the position shown in Fig. 10 to hold the plate in that position for an appreciable time, as for instance, something over a quarter of a revolution of shaft 120, and then quickly get out of the way so that the springs 162 and 163 may move the plate back to its former position.

As shown in Fig. 9, the rivets slide downwardly and accumulate near the plate 153 but can not enter the apertures 138 therein by reason of the various disks 164 (Figs. 13, 14 and 15) until said disks have been turned to the position shown in Fig. 13, wherein the slots 165 in the various disks register with the slots 137. When this occurs one rivet can enter each of the respective slots 165 and the disks are rotated from the position shown in Fig. 13 to that shown in Fig. 14, namely, until the rivets are above the respective passageways 138, whereupon the rivet heads will strike the various projections 166 and be forced from the slots 165 so as to drop down into the passageways 139 to the position shown in Fig. 9. The turning of the disks to the position shown in Fig. 14 will prevent any additional rivets entering the disks so that only one set of rivets may be discharged into the various passageways 139 at any one time. These disks are operated in a back and forth movement by the movement of a rack 167 (Figs. 1 and 9), said rack meshing with the gear wheels 168, there being one gear wheel for each disk and connected to the respective disks through the supporting shaft 169. The rack 167 is operated by the walking beam or centrally pivotally mounted lever 170, said lever being urged in a given direction by a spring 171 and moved in the opposite direction by a cam 172 (Fig. 12), said cam acting on the lever through a bearing roller 173 positioned on a stub shaft 174 carried by lever 170. The cam 172 is shaped to turn the disk from the position shown in Fig. 13 to that shown in Fig. 14 and then allow spring 171 to reverse its movement and turn the disk back to the position shown in Fig. 13, after which it will rest for a given time and repeat the operation, there being provided one supply of rivets for each holder 19 for occupying the position of section 62 shown in Fig. 1.

After the rivets have been placed in position and bent over as shown in Figs. 11 and 28, the rotatable turn-table 13 moves another step so that the holder 19 will move to the position indicated by section 63 and will be operated on so as to thoroughly clench the rivets, as indicated in Fig. 29. As soon as the holder 29 comes to the position indicated by section 63 in Fig. 1 the parts will be substantially as shown in Fig. 1 and Fig. 16. Arranged on the inner side of the holder 19 is a row of clenching members 175 adjustably mounted on the upstanding lug 176 provided on the slide 177. The slide 177 is similar to slide 95 and will therefore need no additional description, while the slide 178 is similar to slide 98 and will need no additional description, these slides being operated by cams 179 and 180 together with a central cam 181 when the shaft 117 is moved. Slide 178 is provided with a row of anvil members 182 arranged in line with the apertures 103 and 104, while the clenching members 175 are also arranged in line with these apertures, whereby when the shaft 117 is rotated the parts will move from the position shown in Fig. 16 until both sets of members 182 and 175 will press against the rivets, the clenching members 175 being formed with notches for causing the rivets to be turned over and clenched as shown in Fig. 29. As soon as the rivets have been thoroughly clenched the members 182 and 175 will be withdrawn and as soon as they are clear of the holder 19 said holder will begin its movement so as to occupy the position indicated by section 64 in Fig. 1, ready for the last operation, namely, the releasing of the completed broom.

The mechanism for releasing the broom is shown adjacent the section 64 in Fig. 1 and is shown as a sectional view in Fig. 17, said releasing mechanism being provided with slides 183 and 184 constructed similar to the slides 95 and 98 and connected up with eccentrics arranged on shaft 40 in a similar manner to the way the slides 95 and 98 are connected with eccentrics, whereby when the shaft 40 rotates the slides will move so that the heads or anvils 185 and 186 will press against the jaws 65 and 66 so as to press the same together slightly and thereby release the pressure of the extension 82 on the pin 79 so that the releasing levers 187 may press the rollers 188 against the hooks 85' and raise the pins 79 against the action of the springs 80. In order to give the releasing levers 187 a proper movement the same are rigidly secured to a shaft 189 supported by a suitable bracket 190 bolted or otherwise rigidly secured at 191 to the frame or braces 5, and said shaft is operated by a lever 192 (Fig. 17). Lever 192 has a resilient member 193 rigidly secured thereto by any suitable means, as for instance, rivets 194, in such a manner as to cause the lower end to be spaced from the lever, as shown in Fig. 24. The lower end of the resilient member 193 carries a roller 195, said roller being engaged by the cam 196 and depressed thereby, the movement being comparatively quick so as to quickly raise the pins 79 as soon as the strain thereon has been removed.

The cam 196 is provided with a peripheral section 197 struck on an arc at the center of the shaft 40 so that when the pins 79 have been raised they are held in an elevated position for a short time, namely, sufficiently long to allow the jaw 66 to move so that the pins 79 will not be in register with the apertures 81. It is of course understood that the cams operating the slides 183 and 184 will begin to move away from the holder 19 as soon as the pins 79 have been raised, so that the jaws may freely move apart under the action of springs 198, as shown in Fig. 19. In order to prevent the jaw 66 from moving too far away from the jaw 65 a pair of hooks 199 are provided interlocking with the pins 200, said hooks acting preferably under gravity, though a spring may be used if desired for causing a positive action. Immediately after the jaws have moved apart as just described the turntable 13 will begin to move the holder 19 until it will move from the position occupied by section 64 in Fig. 1 to the position occupied by section 59, whereupon the finished broom may be manually removed by an upward lifting motion and a new supply of broom corn provided in the holder, which will then repeat the operation. If desired, the operator may shift the clutch 6 by operating either the lever 7 or lever 7' at any time, as for instance, when removing the finished broom and supplying a new batch of broom corn. After the broom has been removed it will appear as shown in Fig. 32 and in order to complete the same ready for marketing the spurs 70 are pressed down or hammered down manually or by another machine as may be preferred.

In Figs. 9 and 10 a container 135 has been shown pivotally connected with a supporting bracket 201, said container being pivoted in this manner in order that it may be moved up and down for causing the rivets to aline themselves in the groove or slot 137. The mechanism for causing this up and down shaking movement is illustrated in Fig. 3 wherein it will be seen that a rod 202 is pivotally connected at 203 to the container 135 and pivotally connected to the crank 204, said crank being rigidly secured to shaft 205 carrying a sprocket wheel 206. A chain 207 passes over sprocket wheel 206 and also over a sprocket wheel 208, the last mentioned sprocket wheel being rigidly secured to shaft 120 so that whenever shaft 120 is rotated motion will be transmitted to the container.

In manufacturing brooms as above described the resulting brooms will be as shown in Figs. 31 and 32 except that the broom corn will be longer, said views being broken off for want of space. These brooms after completed are adapted to be clamped in a holder of the type shown in my prior patent, whereby one holder may be used with a number of different brooms or broom bodies. The first step in the operation of constructing the broom as shown in Figs. 31 and 32 is to provide bundles of broom corn of certain predetermined quantities, said corn being preferably loose and manually placed in the holder 19 of section 57 as shown in Fig. 1, the jaws of said holder being open when in this position. The operator then starts the machine by moving either lever 7 or 7' and does nothing further except to watch the parts to see that everything is operating properly. Before the broom corn is placed in the holder 19 a pair of bands 67 is arranged in the holder so that the spurs 70 will fit into the notches 71 (Fig. 23) in order that when the jaws are clamped together the bands will surround the end of the broom corn. The operator first places the bands in position and then the broom corn and forces the broom corn downwardly as far as possible, after which the movement of the table 36 acting on plate 38 will properly aline the various straws of the broom corn so that the broom corn will appear as shown in Fig. 5 when moved to the position occupied by section 60. It will be noted that if the broom corn is cut perfectly straight and of the proper length the broom corn will be provided with an even end at the top and bottom so that no further trimming will be necessary after the broom has been completed. After the holder carrying the broom has reached section 60 the jaws of the holder are locked and then the holder passes in successive stages past the various operating mechanisms as heretofore described and shown in top plan in Fig. 1, so that the broom corn at the lower end is punched and riveted whereby the bands 67 are firmly held in position and the broom corn is bound rigidly together at the end.

As the finished broom is released by the releasing mechanism arranged opposite section 64 the operator removes the broom and then inserts a new supply of broom corn and a new set of bands. This operation is performed for each holder so that the operator may stand at one point so as to readily remove the finished broom and insert the new bands and broom corn. When the machine is in operation under ordinary circumstances the power shaft 2 continually rotates at a certain speed while the turntable 13, holders 19 carried thereby and associated parts are moved intermittently and the various parts for operating on the broom are moved intermittently so that a substantially even continuous output results.

The dimensions of the parts have not been set forth as it is not believed to be necessary, but it will be understood that the eccentrics 93 and 89 and also the other eccentrics and operating parts are so positioned as to perform the functions assigned thereto. In connection with Fig. 5 it will be noted that the throw of the eccentric 93 is greater than the throw of the eccentric 89 so that the anvil 102 will move further than anvil 101, as anvil 101 merely acts as a stop against which the anvil 102 presses when pressing the broom corn.

Throughout the specification the term "broom corn" has been used, but it will be understood that other materials may be used without departing from the spirit of the invention, as for instance, bast, bamboo, ratan or other material capable of use in making the brooms or brushes.

What I claim is:

1. A broom making machine, comprising a holder for receiving a quantity of broom corn in a loose condition, yielding means acting on said broom corn for normally holding the same in any position in which the corn is left, a table movable in a direction substantially parallel with the stalks of broom corn whereby said stalks are alined, a rod connected with said table, a pivotally mounted lever for moving said rod back and forth, a rotatable shaft, a link eccentrically connected with said shaft and pivotally connected with said lever whereby as the shaft rotates the lever will be moved back and forth, means for rotating said shaft, means for compressing said broom corn in said holder, and a plurality of successively operating mechanisms for positioning a retaining and clamping band on one end of said broom corn.

2. A broom making machine, comprising a plurality of holders, a turn-table for supporting said holders, a vertical shaft supporting said turn-table, adjustable bearing members for supporting said shaft whereby the shaft may be raised and lowered, means for rotating said shaft and the turn-table arranged thereon together with said holders, and a plurality of independent mechanisms simultaneously operated for acting on said holders in such manner as to apply a clamping and retaining member to the broom corn arranged therein.

3. A broom making machine, comprising a holder for receiving a quantity of loose broom corn, a pair of plates arranged in said holder and adapted to press against the broom corn, resilient means for acting on said plates, a vertically movable table engaging the lower end of said broom corn for raising the same and causing an alinement of the broom corn, and a plurality of independent mechanisms successively operating on the broom corn and holder for applying a pair of clamping bands to one end of the broom corn while in the holder.

4. A broom making machine, comprising a holder for receiving a quantity of loose broom corn, said holder having a plurality of notches in each section thereof so as to receive spurs from retaining bands whereby there may be supported a retaining band on each side of said broom corn, means for causing the holder to clamp the broom corn and press said bands tightly against the broom corn, a lock for locking said holder in a clamped position, a punching mechanism for punching a plurality of holes in one end of the broom corn after the broom corn has been clamped, means for positioning rivets in said holes, means for clenching said rivets, and means for releasing said holder so that the finished broom may be removed therefrom.

5. A broom making machine, comprising a turn-table, a plurality of holders arranged on said turn-table adapted to receive a quantity of loose broom corn, a plurality of means partially surrounding said table for acting on said holders and the broom corn therein for applying a clamping band to the corn, a plurality of power shafts for operating said mechanisms, said power shafts being connected together by meshing gears, a pair of worm wheels for driving said shafts, and a power shaft provided with a pair of worms for driving said worm gears.

6. A broom making machine, comprising a rotatable table, a plurality of holders mounted on said table, each of said holders being provided with a stationary jaw and a radially movable jaw on the outer side thereof, a spring for normally holding said jaws open, said holder being designed to receive a quantity of broom corn, a hook for limiting the opening of said movable jaw, means for moving said movable jaw toward the center of said rotatable table and thereby compressing said broom corn, means for locking said movable jaw in its new position so as to hold the broom corn compressed, said means including an extension on the stationary jaw and a pin on the movable jaw engaging said extension, and a plurality of mechanisms operating after the jaw has been locked, said last mentioned mechanisms acting to secure a band on the broom corn at one end.

7. A broom making machine, comprising a rotatable table, a plurality of holders arranged on said table, each of said holders having a stationary and a movable jaw, a single compressing mechanism for moving the movable jaw to a closed position, said holders being arranged to receive loose broom corn whereby when the movable jaw is closed said broom corn will be compressed, said compressor comprising a pair of anvils engaging the opposite sides of said holder, a slide for each of said anvils, one slide being substantially U-shaped and overlapping the other slide so as to form a guide therefor, and means for simultaneously actuating said slides, and means acting on said broom corn after the holder has moved away from said compressor for securing a clamping member on one end of the broom corn.

8. A broom making machine, comprising a rotatable table, a plurality of holders arranged on said table adapted to receive loose broom corn, each of said holders being provided with an outer movable jaw, a pair of oppositely moving anvils for moving the jaw to a closed position whereby said broom corn is compressed, means for locking said jaw in its closed position, an eccentric connected with each of said anvils for actuating the same, a shaft rotating all of said eccentrics, power means for rotating said shaft, and a plurality of mechanisms acting on said holders and said broom corn for securing a pair of retaining bands on one end of the broom corn after the broom corn has been compressed by said anvils.

9. In a broom making machine of the character described, a rotatable support, a plurality of holders arranged on said support and adapted to receive loose broom corn, means for compressing said broom corn, means for applying securing means to said broom corn adjacent one end for holding said end compressed, and means for releasing said broom corn after said securing means have been applied, said releasing mechanism comprising a pair of jaws, and means for moving said jaws to a slightly compressed position and then to a released position.

10. In a broom making machine of the character described, a rotatable support, a plurality of holders arranged on said support and adapted to receive broom corn, each of said holders having a movable part, a compressor for moving said movable part so as to press the broom corn in the holders, a catch in each holder for locking the movable part in its compressed position, means for applying fastening means to the broom corn so as to bind the same together at one end, and means for releasing said catch, said means including a pivotally mounted member for pulling said catch in an open position, a lever connected with said pivotally mounted member, and a cam acting on said lever so as to move the same in such direction as to cause the proper withdrawal of said catch.

11. In a broom making machine of the character described, a rotatable support, a plurality of holders arranged on said support formed with a movable portion, said holders being designed to receive broom corn in a loose condition, a compressor for moving said movable member and compressing the broom corn in the various holders, a catch formed with a sliding pin for locking the movable member in a compressed position, said pin having a hook member extending therefrom, means for applying binding means to one end of said broom corn, and means for releasing said catch, said means including a shaft, an arm connected with said shaft and extending beneath said hook member, a lever connected with said shaft, a spring connected with said lever and arranged with one end normally spaced from the lever, a roller arranged on the end of said spring spaced from the lever, and a cam operating on said roller whereby pressure will be brought to bear first on the spring and gradually communicated to the lever so that there will be a gradually increasing tension on said shaft and on the arm beneath said hook member so as to give said pin a quick pull without striking the same.

12. In a broom making machine of the character described, a rotatable turn table, a plurality of holders arranged on said turn table adapted to receive broom corn in a loose condition, each of said holders being formed with a movable section, a lock arranged on each of said holders, means for moving said movable section and compressing said broom corn, said movable section being moved until said lock is unlocked whereby the movable section will move away from its compressed position, means for applying retaining members through one end of said broom corn for holding the same in a compressed condition, and a releasing mechanism for releasing said catch, said releasing mechanism comprising an arm for moving said catch to an open position, a lever connected with said arm, a cam operated on by said lever for swinging said arm, a pair of presser heads for pressing said movable section while said arm is moving said catch to an open position, and cams for moving said heads.

13. In a broom making machine of the character described, a rotatable turn-table, a plurality of equally spaced vertically positioned holders arranged on said turn-table, each of said holders being formed with a movable jaw and arranged to receive a quantity of straw in a loose condition, a compressor for closing the jaws in the respective holders after the broom corn has been placed therein, means for locking the jaws in a closed position, means for punching holes in the compressed broom corn after the same has been compressed, means for applying rivets for holding retaining bands in place on one end of the broom corn after said holes have been provided therein, said applying means including members for bending the ends of said rivets to one side, means for completing the clenching of said rivets after having been placed in position, and a releasing mechanism for unlocking said jaws so that the finished broom may be removed.

14. A broom making machine comprising a holder for receiving a quantity of broom corn in loose condition, said holder having notches therein for receiving spurs from clamping bands mounted in the holder, a pair of plates for preventing the broom corn from entering said notches, means for movably supporting said plates, a spring for each plate for urging the same against the broom corn, said holders being provided with notches for receiving said plates when the broom corn is pressed in the holder, an oscillating member for alining said broom corn, means for pressing said broom corn together when the same has been properly alined, and a plurality of mechanisms for applying rivets to said corn and said bands for securing said bands in position.

15. A broom making machine comprising a plurality of holders, each of said holders having a fixed jaw and a movable jaw, said movable jaw having a hollow extension therein and an aperture merging into the hollow extension, an extension or rod projecting from the fixed jaw fitting into said hollow extension, said last mentioned extension or rod having an aperture adapted to be brought in relation with the first mentioned aperture when the movable jaw has been closed, a spring pressed locking pin arranged with one end in the first mentioned aperture positioned to move automatically into the second mentioned aperture when the said movable jaw is closed, a hook member extending from said spring pressed locking pin, means engaging said locking pin for raising the same against the action of said spring, means acting on said movable jaw for releasing the pressure on said locking pin at the time means acting on the said hook operates to disconnect the locking pin, a rotatable member for supporting said holder, means acting on the holder for closing said movable jaw, means for applying rivets to the broom corn in said holder prior to the release of said locking pin, and means for operating said releasing means after the rivets have been applied.

16. A broom making machine comprising means for receiving a quantity of broom corn in a loose condition, said means acting as a holder, said holder being provided with a stationary jaw and a movable jaw, said jaws being formed with means for holding a band therein, an anvil for acting on the lower part of said movable jaw for pressing one end of said broom corn, an adjustable pressure member connected with said anvil and acting on the upper part of said movable jaw for maintaining said movable jaw substantially parallel with the compression of the broom corn, means for locking said jaw in a closed position, means for supplying rivets to said band when the broom corn is in a compressed condition, and means for releasing said movable jaw.

17. A broom making machine comprising a rotatable table, a plurality of holders mounted on said table adapted to receive loose broom corn, mechanisms arranged around said table adapted to act on said holders and broom corn for securing clamping bands to the broom corn, a main power shaft connected with the rotatable table for moving the same, an independent shaft connected with each of said mechanisms, said shafts being arranged at a plurality of angles to said main shaft so as to substantially surround said table, beveled gears connected with said last mentioned shafts, a pair of driving gears connected with said main shaft, and a pair of power gears meshing with said driving gears, said power gears connected with two of the said mentioned shafts for transmitting power thereto from said main shaft.

18. A broom making machine comprising a holder arranged in a vertical position, said holder being provided with a stationary jaw and a movable jaw, said jaws being formed with recesses for receiving bands, said jaws also being adapted to receive broom corn in a loose state, means for moving the movable jaw toward the stationary jaw after said broom corn and said band have been placed therein, a punching mechanism for punching holes through said broom corn, a rivet supplying means for supplying rivets to a point adjacent said holes, a riveting mechanism for moving said rivets into position in said jaws, and then clenching the end thereof, and means for releasing said corn after the rivet has been clenched.

19. In a broom making machine of the character described, a rotatable support, a plurality of holders arranged on said support, each of said holders having a movable member and a lock for locking said movable member in a closed position, said lock including a pin having a hook-shaped end, means for compressing broom corn arranged in said holder and moving the movable member to a locked position, means for positioning rivets in one end of said broom corn while in a compressed position and clenching one end of the rivets, and a releasing mechanism for said movable member, said releasing mechanism including a pivotally mounted arm having one end projecting beneath the hooked end of said pin, a yielding member connected with said arm, a cam for actuating said yielding member for moving said arm until said pin has been thrown, and means for moving said movable member to a further compressed position while the pin is being removed.

HENRY J. EDLUND.

Copies of this patent may be obtained for five cents each, by addressing the "Commissioner of Patents, Washington, D. C."